United States Patent [19]
Kimura et al.

[11] Patent Number: 5,116,664
[45] Date of Patent: May 26, 1992

[54] TITANIUM-MICA COMPOSITE MATERIAL

[75] Inventors: Asa Kimura; Fukuji Suzuki, both of Yokohama, Japan

[73] Assignee: Shiseido Company Ltd., Tokyo, Japan

[21] Appl. No.: 670,380

[22] Filed: Mar. 14, 1991

Related U.S. Application Data

[63] Continuation of Ser. No. 154,164, Feb. 9, 1988, abandoned.

[51] Int. Cl.$^5$ .................. B32B 9/00; B32B 19/00
[52] U.S. Cl. .................... 428/216; 428/336; 428/403; 428/446; 428/688; 428/689; 106/286.4; 106/436; 106/DIG. 3
[58] Field of Search ............ 428/403, 324, 216, 336, 428/446, 688, 689; 350/166; 106/DIG. 3, 436, 286.4

[56] References Cited

U.S. PATENT DOCUMENTS 3,440,075  4/1969  Marshall .
3,771,308  1/1973  Brand et al. .
4,537,636  8/1985  Bernard et al. .
4,615,940  10/1986  Panush et al. ............... 428/324
4,623,396  11/1986  Kimura et al. .

FOREIGN PATENT DOCUMENTS 161055  10/1982  Japan .

OTHER PUBLICATIONS

Chemical Abstracts, vol. 98, No. 16, Apr. 18, 1983, p. 82, Abstract No. 127778p, Columbus, OH, U.S.A.

Primary Examiner—George F. Lesmes
Assistant Examiner—Terrel Morris
Attorney, Agent, or Firm—Sprung Horn Kramer & Woods

[57] ABSTRACT

A titanium-mica composite material comprising (i) mica, (ii) a first coating composed of titanium dioxide, coated on the surface of the mica, and (iii) a second coating compound of powder particles of at least one metal selected from the group consisting of cobalt, nickel, copper, zinc, tin, gold, and silver coated on the first coating.

7 Claims, 2 Drawing Sheets

TITANIUM-MICA COMPOSITE MATERIAL

This application is a continuation of application Ser. No. 154,164, filed Feb. 9, 1988, now abandoned.

BACKGROUND OF THE INVENTION

1. Field of the Invention

The present invention relates to a titanium-mica composite material. More specifically, it relates to a titanium-mica composite material suitable for use as a colorant or pigment providing a colored pearl gloss in, for example, coating compositions, cosmetics, plastics, printing inks, paints, ornaments, daily necessities, fiber goods, and ceramics, and further suitable for use as a conductive material and electromagnetic wave shield in, for example, conductive layers and recording layers in recording papers and antistatic materials. The titanium-mica composite material according to the present invention exhibits an excellent color tone (e.g., chroma and brightness), and an excellent safety, light resistance, chemical resistance, solvent resistance, and heat resistance.

2. Description of the Prior Art

As is well known in the art, conventional titanated mica composite materials used, as a pigment, in, for example, cosmetics, paints, and plastics, comprise mica and a titanium dioxide layer formed coated on the surface of the mica, because these conventional titanated mica composite materials have a pearl gloss and various interference colors. These titanated mica pigments are generally prepared as disclosed in Japanese Examined Patent Publication (Kokoku) No. 43-25644 by hydrolyzing an aqueous solution of the inorganic acid salt of titanium (e.g., titanyl sulfate) in the presence of mica to deposit hydrous titanium oxide on the surface of mica, followed by heating, although these titanated mica pigments also can be prepared by a vacuum deposition method. As the starting mica, muscovite is generally used, but biotite or other mica can be also used. The mica is previously subjected to aqueous grinding and sifting to obtain powder particles having a uniform particle size. The resultant titanated mica pigments exhibit various interference colors, depending upon the thickness of the titanium dioxide layer coated on the surface of the mica. The interference colors are generally silver when the titanium dioxide content is 10% to 26% by weight, gold when the titanium dioxide content is 26% to 40% by weight, red, blue, and green when the titanium dioxide content is increased from 40% by weight to 50% by weight, and higher order interference colors when the titanium dioxide content is 50% to 60% by weight.

The conventional titanated mica pigments thus prepared have a pearl gloss and various interference colors. However, the appearance colors thereof are always near or close to white and pigments having a bright appearing color in agreement with the interference color cannot be obtained.

Various kinds of color pigments such as iron oxides, ferric ferrocyanide, chromium oxides, carbon black, and carmine have been heretofore incorporated into the above-mentioned titanated pigments to obtain various colored appearance. However, the stabilities of, for example, the safety, light resistance, chemical resistance, solvent resistance, and heat resistance of these colored titanated mica pigments largely depend upon the properties of the color pigments incorporated thereinto. For example, blue titanated mica pigments mainly containing ferric ferrocyanide result in undesirable color fading in an alkaline solution and are degraded and faded at a temperature of 200° C. to 300° C. In addition, although green titanated mica pigments comprise a mixture of iron oxide and ferric ferrocyanide or chromium oxides, these pigments have a poor, for example, chemical resistance and heat stability, and have possible disadvantages from the safety point of view due to the toxicity of the chromium. Thus, the application ranges of these pigments are limited. Furthermore, blue or green organic pigments such as phthalocyanine blue, brilliant blue FCF aluminum lake, Quinizarin green, and phthalocyanine green have a poor safety and, for example, heat resistance, light resistance, and chemical resistance, and therefore, these organic pigments are not substantially used for coloring pearl gloss materials. On the other hand, red titanated mica composite pigments containing carmine are color faded due to light. Furthermore, the colored titanated mica pigments containing the color pigments cause color segregation or foreign odor generation in a solvent or various compositions (e.g., cosmetics) when color pigments are incorporated.

SUMMARY OF THE INVENTION

Accordingly, an object of the present invention is to eliminate the above-mentioned disadvantages in the prior arts and to provide a titanium-mica composite material having an extremely improved color tone (e.g., chroma and brightness), a consistent appearance color and interference color, and excellent pigment characteristics such as stability, safety, light resistance, alkali resistance, solvent resistance, and heat resistance, as well as an excellent electrical conductivity such as a specific resistance and excellent magnetic characteristics.

Another object of the present invention is to provide a titanium-mica composite material capable of being formulated into cosmetic compositions with a good dispersibility and without causing undesirable color fading, color segregation, and foreign odor generation after the formulation.

Other objects and advantages of the present invention will be apparent from the description set forth hereinbelow.

In accordance with the present invention, there is provided a titanium-mica composite material comprising (i) mica, (ii) a first coating composed of titanium dioxide, and (iii) a second coating composed of powder particles of at least one metal selected from the group consisting of cobalt, nickel, copper, zinc, tin, gold, and silver coated on the first coating.

BRIEF DESCRIPTION OF THE DRAWINGS

The present invention will be better understood from the description set forth below with reference to the drawings in which.

DESCRIPTION OF THE PREFERRED EMBODIMENTS

Figure 1:
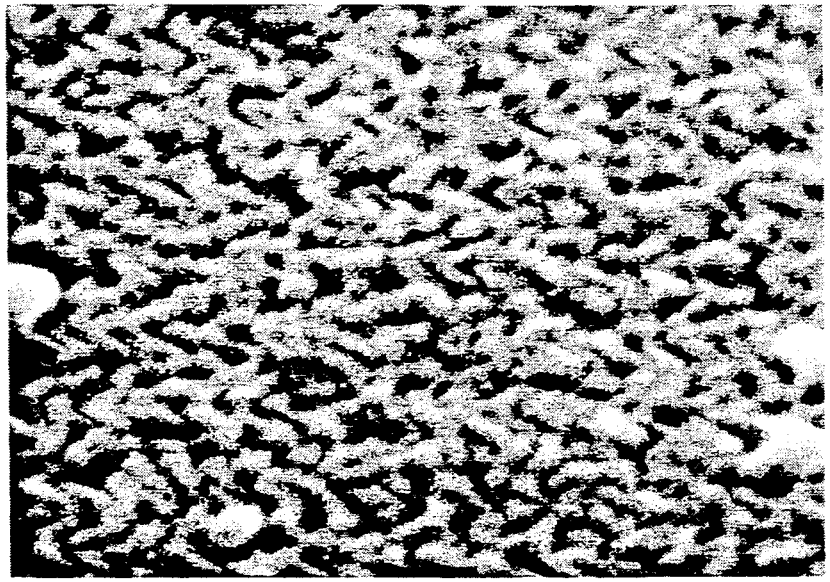
FIG. 1 is a photograph of a scanning electron microscope ($\times 72,000$) illustrating a surface condition of the blue pearl gloss material obtained in Example 1.

Any conventional mica, such as a commercially available muscovite, is usable in the present invention.

However, biotite can be also optionally used. The particle size of the mica may vary over a wide range. However, when the present mica composite material is intended to be utilized as a pearl gloss pigment in a cosmetic composition, mica having a smaller particle size and having a flat shape among the conventionally commercially available mica having a particle size of approximately 1 to 100 μm is preferable, because a beautiful color tone and pearl gloss can be readily obtained thereby.

According to the present invention, the surface of mica is coated with titanium dioxide, followed by coating with one or more metallic powder particles selected from the group consisting of cobalt, nickel, copper, zinc, tin, gold, and silver. Although there are no critical limitations to the amounts of the titanium oxide and the metallic powder particles in the present titanium composite materials, the preferable amount of the titanium dioxide is 10 to 400 parts by weight, more preferably 15 to 250 parts by weight, based on 100 parts by weight of the mica, and the preferable amount of the metallic powder particle is 0.01 to 100 parts by weight, more preferably 1 to 60 parts by weight, based on 100 parts by weight of the mica. The use of too large an amount of the titanium dioxide tends to result in the decrease in the desired pearl gloss and color tone, whereas the use of too small an amount of the titanium dioxide tends to result in the decrease in the pearl gloss and color tone. On the other hand, the use of too small an amount of the metallic powder particles tends to result in the non-agreement of the color appearance with the interference color thereof, although the resultant mica possesses the interference color. Contrary to this, the use of too large an amount of the metallic powder tends to result in an unpreferable remarkable blackening of the composite powder.

Although the thickness of the first coating deposited on the surface of the mica may vary over a wide range, the thickness of the titanium dioxide on the surface of the mica is preferably 200 Å or more, more preferably 900 Å or more, particularly when a composite material having an excellent appearance and interference color other than black is desired.

Although there is no specific limitation to the coating amount of the second coating composed of the above-mentioned metallic powder particles in the present composite material, the thickness of the second coating is preferably 5 Å to 1000 Å, more preferably 200 Å to 600 Å. When the thickness of the second coating is less than 5 Å, the desired composite material having an excellent color tone usually cannot be prepared.

The titanium-mica composite material according to the present invention comprises mica coated with titanium dioxide on the surface thereof, followed by coating with the metallic powder particles of one or more metals selected from the group consisting of cobalt, nickel, copper, zinc, tin, gold, and silver. The titanium-mica composite material according to the present invention can be prepared by various methods. For example, commercially available titanated mica pigments (or titanium-mica pigments) are dispersed in an aqueous solution of one or more of strong acids, tin chloride (or stannous chloride), and palladium chloride to activate the surface of the titanated mica. After filtration, the activated mica is dispersed in an electroless plating bath to effect the uniform coating of the surface of the activated mica with metallic powder particles. The electroless plating bath contains a metal salt and a reducing agent so that a metal is reductively deposited from the metal salt solution by the action of the reducing agent. Furthermore, the electroless plating bath may optionally contain, in addition to the above-mentioned essential components, chelating stabilizers, buffers and the like.

The metal salts usable in the electroless plating baths are sources of plating metals and, therefore, any soluble salts may be used in the present invention. Examples of such salts are sulfates, chlorides, nitrates, carbonates, and cyanides of cobalt, nickel, copper, zinc, tin, gold, and silver. These metal salts, may be used alone or in any mixture thereof.

Examples of the reducing agents usable in the present invention are sodium hypophosphate, sodium hyposulfate, sodium anhydrous sulfite, hydrazine chloride, hydrazine sulfate, hydrazine oxalate, hydroquinone, hydrosulfide, tartrates, formalin, sucrose, monosaccharides, and glyoxal. These reducing agents may be used alone or in any mixture thereof.

The chelating stabilizers are used in the present invention for stabilizing the metal salts in the plating bath by forming the metal salts in the form of the complex salts or chelates, whereby the spontaneous degradation of the metal salts is prevented and the metals are readily deposited or separated out. Examples of such stabilizers are complex-forming agents such as tartrates and citrates and chelating agents such as triethanolamine and EDTA. These agents may be used alone or in any mixture thereof.

Examples of the buffers usable in the present invention are organic acids such as acetic acid, tartaric acid and sodium, potassium and ammonium salts thereof as well as sodium carbonate, potassium carbonate, ammonium carbonate, sodium bicarbonate, potassium bicarbonate, and ammonium bicarbonate. These compounds may be used alone or in any mixture thereof. Furthermore, as disclosed in the above-mentioned Japanese Examined Patent Publication No. 43-25644 filed by du Pont, an aqueous solution of an inorganic salt of titanium is hydrolyzed in the presence of mica powder particles to deposit hydrous titanium dioxide on the surface of the mica powder particles, followed by coating with the metal powder particle by the above-mentioned electroless plating method. Alternatively, the hydrous titanium dioxide is deposited on the surfaces of the mica particles, followed by heating to form titanated mica and, thereafter, the metal powder particles are coated thereover by the above-mentioned electroless plating method.

Thus, according to the present invention, the titanium-mica composite materials having the desired appearance color, magnetic properties, and electroconductivity can be obtained by appropriately selecting, for example, the amounts of the hydrous titanium dioxide and/or the titanium dioxide, kinds of the metals subjected to the electroless plating, the amounts (or ratios) of the compounds used, pH, and the reaction temperature.

The titanium-mica composite material according to the present invention exhibits an excellent color tone (e.g., chroma and brightness), a good consistent appearance color and interference color, excellent safety, weather resistance, light resistance, chemical resistance, solvent resistance, and heat resistance. Accordingly, the present composite material can be advantageously used as a coloring agent or colored pearl gloss-providing agent in various field, including coating compositions, cosmetics, plastics, inks, paints, ornaments, daily necessities, textile products, and ceramics. Furthermore, the present titanium-mica composite materials can be used as an electroconductive layer and registration layer of recording paper, electroconductive materials such as antistatic agents, and electromagnetic wave shields. Thus, the present composite materials have a large industrial applicability.

When the titanium-mica composite material according to the present invention is used in a cosmetic composition, the present composite material can be incorporated into the cosmetic composition in any amount usually used for a coloring agent, pigment, or powder, for example, in an amount of 0.1% to 96% by weight, preferably 1% to 70% by weight.

The present composite material can be incorporated into any conventional cosmetic composition in the form of, for example, liquid creams, lotions, creams, ointments, sticks, spray, powders, pressed powders and multi-layers (e.g., powder-water-oil layers). The present composite materials can be incorporated into various type cosmetics such as facial preparations, make-up preparations, hair preparations, body preparations, and fragrant preparations, preferably make-up preparations such as foundations, rouges, face powders, eye make-ups, lipsticks, and nail enamels.

The other ingredients incorporated into the cosmetic compositions containing the present composite material can be any ingredients which are used in conventional cosmetic compositions. Examples of such ingredients are oils such as higher aliphatic alcohols, higher fatter acids, ester oils, paraffin oils, and waxes; alcohols such as ethyl alcohol, propylene glycol, sorbitol, and glucose; humectants such as mucopolysaccharides, collagenes, PCA salts, and lactates; various surfactants such as nonionic, cationic, anionic, and amphoteric surfactants; thickener such as gum arabic, xanthan gum, polyvinyl pyrrolidone, ethyl cellulose, carboxymethyl cellulose, carboxyvinyl polymer, and modified or unmodified clay minerals; solvents such as ethyl acetate, acetone, and toluene; organic and inorganic pigments and dyes; anti-oxidants such as BHT and tocopherol; water; chemicals; UV absorbers; pH buffers; chelating agents; preservatives; and perfumes.

EXAMPLES

The present invention will now be further illustrated by, but is by no means limited to, the following Examples, wherein "parts" and "percent" are all on a weight basis unless otherwise specified.

Example 1

(Preparation)

A 50 g amount of mica was added to 500 g of ion-exchanged water and then uniformly dispersed therein while thoroughly stirring. Then, 273.0 g of a 40% aqueous titanyl sulfate solution was added to the dispersion obtained above. The mixture was boiled upon heating for 3 hours while stirring. After allowing to cool, the mixture was filtered and washed with water, followed by drying at a temperature of 900° C. Thus, 80 g of the titanated mica, i.e., the mica coated with titanium dioxide, was obtained.

A 50 g amount of the resultant titanated mica was dispersed in 500 ml of an $8 \times 10^{-3}$M aqueous solution of stannous chloride and, after filtration, was again dispersed in 500 ml of a $5 \times 10^{-4}$M aqueous solution of palladium chloride. After filtration, 50 g of the activated titanated mica obtained was dispersed at a temperature of 90° C. and pH of 8–10 for one hour in 950 ml of an electroless cobalt plating bath comprising 27 g/l sodium hypophosphate, 268 g/l Rochelle salt, and 47 g/l cobalt sulfate. After filtration and washing with water, the resultant product was dried at a temperature of 150° C. to obtain 53 g of a blue pearl gloss material having both brilliant appearance color and interference color.

The particle surface of the blue pearl gloss material obtained above is as shown in FIG. 1, i.e., the photomicrograph (×72,000) obtained by using a scanning type electron micrograph. As is clearly observed from FIG. 1, the surface of the particle of the blue pearl gloss titanium-mica composite material was sufficiently coated with the finely divided rod-like particles.

Figure 2:
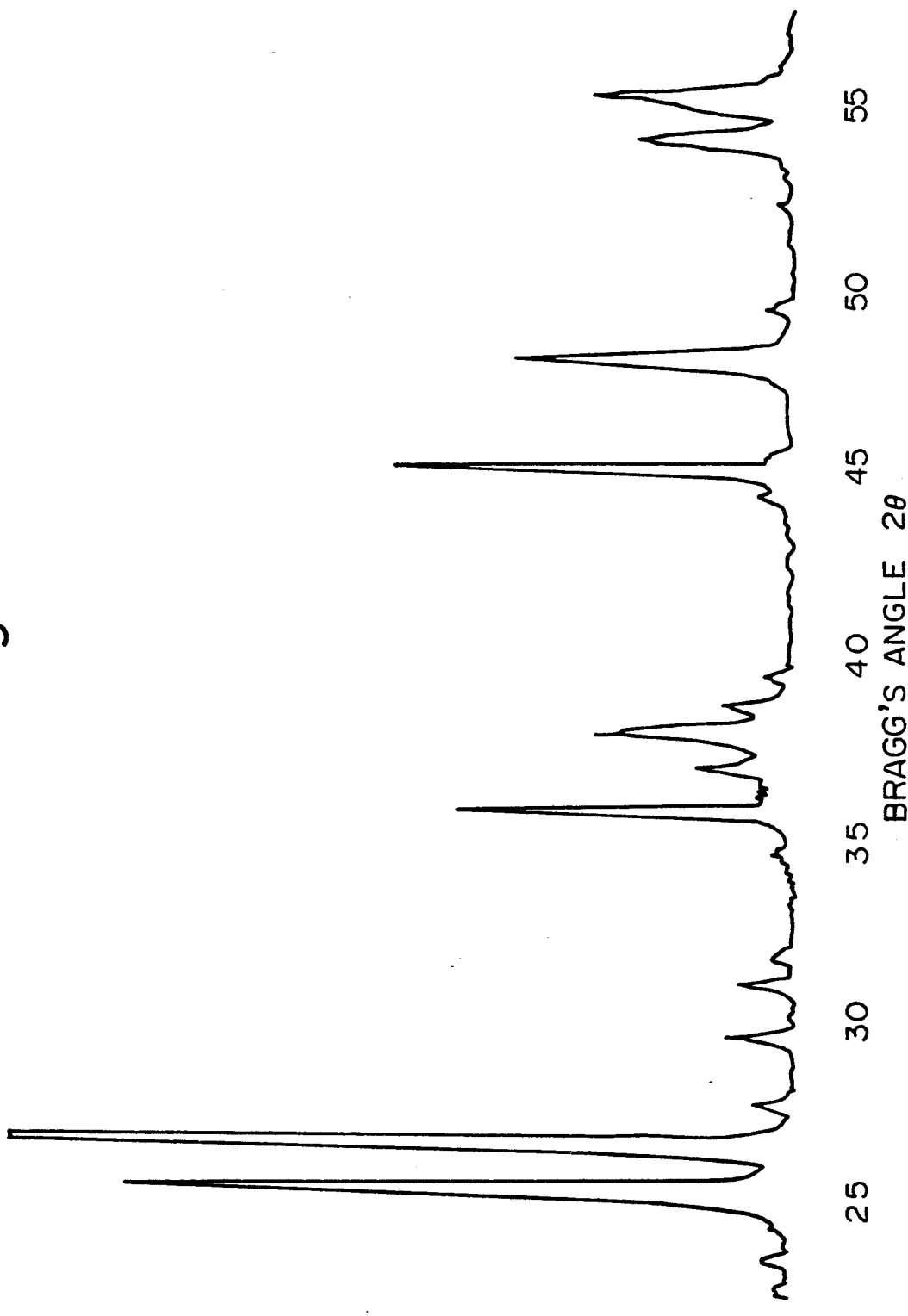
FIG. 2 is an X-ray diffraction pattern chart of the above-mentioned blue pearl gloss material.

The X-ray diffraction pattern (Cu-K$\alpha$ line) of the resultant blue pearl gloss material was as shown in FIG. 2. As is clearly observed in FIG. 2, a peak at a diffraction angle (i.e., Bragg's angle $2\theta$) of approximately 25.3° is present in addition to the diffraction peaks of the mica. This peak corresponds to (101) of the strongest peak of the anatase type titanium dioxide.

Furthermore, the amount of the metallic cobalt coated on the surface of the titanium-mica particles is determined according to the following method.

That is, the blue pearl gloss material (i.e., specimen) obtained above was ground in an agate mortar to form amorphous mica. From the fluorescent X-ray measurement of the amorphous mica, the intensity at an angle of 52.18° of the diffraction line (K$\alpha$) of the metallic cobalt was determined and the metallic cobalt content was determined according to the calibration curve of the diffraction intensity of the known mixing ratio of mica and cobalt, previously obtained.

The content of the titanium dioxide included in the resultant blue pearl gloss material was determined.

The blue pearl gloss material (i.e., specimen) obtained above was ground in an agate mortar to form amorphous mica and the intensity of the diffraction of the titanium dioxide was measured from a powdery determination method of X-ray diffraction (Cu-K$\alpha$ line) of the amorphous specimen. The amount of the titanium dioxide was determined from the intensity according to the calibration curve of the diffraction intensity of the known mixing ratio of the mica and the titanium dioxide, previously obtained.

As a result, it was found that the resultant blue pearl gloss material comprised 86.0 parts of titanium dioxide and 16.3 parts of metallic cobalt coated over 100 parts of the mica.

Example 2

(Preparation)

A 50 g amount of mica was added to 500 g of ion-exchanged water and then uniformly dispersed therein while thoroughly stirring. Then, 312.5 g of a 40% aqueous titanyl sulfate solution was added to the dispersion obtained above. The mixture was boiled upon heating for 3 hours while stirring. After allowing to cool, the mixture was filtered and washed with water, followed by drying at a temperature of 900° C. Thus, 100 g of the titanated mica, i.e., the mica coated with titanium dioxide, was obtained.

A 50 g amount of the resultant titanated mica was dispersed in 500 ml of an $8 \times 10^{-3}$M aqueous solution of stannous chloride and, after filtration, was again dispersed in 500 ml of a $5 \times 10^{-4}$M aqueous solution of palladium chloride. After filtration, 50 g of the activated titanated mica obtained was dispersed at a temperature of 80° C. and a pH of 8-10 for one hour in 1200 ml of an electroless nickel plating bath comprising 10 g/l sodium hypophosphate, 100 g/l sodium citrate, 50 g/l ammonium chloride, and 30 g/l nickel chloride. Thereafter, the mica was dispersed for a further one hour after adding 1200 ml of 35% formalin. After filtration and washing with water, the resultant product was dried at a temperature of 150° C. to obtain 54 g of a green pearl gloss material having both a brilliant appearance color and interference color.

The amounts of the titanium dioxide and the metallic nickel coated over the mica in the green pearl gloss material obtained above were determined in the similar manner as in Example 1.

As a result, it was found that the green pearl gloss material comprised 98.6 parts of titanium dioxide and 16.2 parts of metallic nickel over 100 parts of the mica.

Example 3

(Preparation)

A 50 g amount of mica was added to 500 g of ion-exchanged water and then uniformly dispersed therein while thoroughly stirring. Then, 273.0 g of a 40% aqueous titanyl sulfate solution was added to the dispersion obtained above. The mixture was boiled upon heating for 3 hours while stirring. After allowing to cool, the mixture was filtered and washed with water, followed by drying at a temperature of 900° C. Thus, 90 g of the titanated mica, i.e., the mica coated with titanium dioxide, was obtained.

A 50 g amount of the resultant titanated mica was dispersed in 500 ml of an $8 \times 10^{-3}$M aqueous solution of stannous chloride and, after filtration, was again dispersed in 500 ml of a $5 \times 10^{-4}$M aqueous solution of palladium chloride. After filtration, 50 g of the activated titanated mica obtained was dispersed at a temperature of 22° C. and a pH of 11.5 for one hour in 1200 ml of an electroless copper plating bath comprising 170 g/l Rochelle salt, 50 g/l sodium hydroxide, 30 g/l sodium carbonate, and 35 g/l copper sulfate. After filtration and washing with water, the resultant product was dried at a temperature of 150° C. to obtain 52.6 g of a blue pearl gloss material having both a brilliant appearance color and interference color.

The amounts of the titanium dioxide and the metallic copper coated over the mica in the blue pearl gloss material obtained above were determined in the similar manner as in Example 1.

As a result, it was found that the blue pearl gloss material comprised 77.4 parts of titanium dioxide and 8.5 parts of metallic copper over 100 parts of the mica.

Example 4

(Preparation)

A 50 g amount of mica was added to 500 g of ion-exchanged water and then uniformly dispersed therein while thoroughly stirring. Then, 150.0 g of a 40% aqueous titanyl sulfate solution was added to the dispersion obtained above. The mixture was boiled upon heating for 3 hours while stirring. After allowing to cool, the mixture was filtered and washed with water, followed by drying at a temperature of 900° C. Thus, 100 g of the titanated mica, i.e., the mica coated with titanium dioxide, was obtained.

A 50 g amount of the resultant titanated mica was dispersed in 500 ml of an $8 \times 10^{-3}$M aqueous solution of stannous chloride and, after filtration, was again dispersed in 500 ml of a $5 \times 10^{-4}$M aqueous solution of palladium chloride. After filtration, 50 g of the activated titanated mica obtained was dispersed at a temperature of 90° C. and a pH of 8-10 for one hour in 550 ml of an electroless cobalt plating bath comprising 27 g/l sodium hypophosphate, 268 g/l Rochelle salt, and 47 g/l cobalt sulfate. After filtration and washing with water, the resultant product was dried at a temperature of 150° C. to obtain 51.2 g of a red pearl gloss material having both brilliant appearance color and interference color.

The amounts of the titanium dioxide and the metallic cobalt coated over the mica in the red pearl gloss material obtained above were determined in the similar manner as in Example 1.

As a result, it was found that the red pearl gloss material comprised 45.1 parts of titanium dioxide and 9.4 parts of metallic cobalt over 100 parts of the mica.

Example 5

(Preparation)

A 50 g amount of titanated mica (i.e., Iriodin 225 having blue interference color, available from Merck, West Germany) was dispersed in 500 ml of an $8 \times 10^{-3}$M aqueous solution of stannous chloride and, after filtration, was again dispersed in 500 ml of a $5 \times 10^{-4}$M aqueous solution of palladium chloride. After filtration, the resultant activated titanated mica (i.e., Iriodin 225) was dispersed at a bath temperature of 80°-90° C. and a pH of 11.5 for one hour in 500 ml of an electroless zinc plating bath comprising 60 g/l zinc cyanide, 60 g/l sodium citrate, 60 g/l sodium hypophosphate, and 80 g/l sodium cyanide. After filtration and washing with water, the resultant product was dried at a temperature of 150° C. to obtain 52.2 g of a blue pearl gloss material having both a brilliant appearance color and interference color.

The amounts of the titanium dioxide and the metallic zinc coated over the mica in the blue pearl glass material obtained above were determined in the similar manner as in Example 1.

As a result, it was found that the blue pearl gloss material comprised 92 parts of titanium dioxide and 9.6 parts of metallic zinc over 100 parts of the mica.

Example 6

(Preparation)

A 50 g amount of titanated mica (i.e., Iriodin 217 having red interference color, available from Merck, West Germany) was dispersed in 500 ml of an $8 \times 10^{-3}$M aqueous solution of stannous chloride and, after filtration, was again dispersed in 500 ml of a $5 \times 10^{-4}$M aqueous solution of palladium chloride. After filtration, the resultant activated titanated mica (i.e., Iriodin 217) was dispersed at a room bath temperature for one hour in 500 ml of an electroless tin plating bath comprising 6 g/l stannous chloride, 55 g/l thiourea and 39 g/l tartaric acid. After filtration and washing with water, the resultant product was dried at a temperature of 150° C. to obtain 50.1 g of a red pearl gloss material having both a brilliant appearance color and interference color.

The amounts of the titanium dioxide and the metallic tin coated over the mica in the red pearl gloss material obtained above were determined in the similar manner as in Example 1.

As a result, it was found that the red pearl gloss material comprised 69 parts of titanium dioxide and 5.1 parts of metallic tin over 100 parts of the mica.

Example 7

(Preparation)

A 50 g amount of mica was added to 500 g of ion-exchanged water and then uniformly dispersed therein while thoroughly stirring. Then, 150.0 g of a 40% aqueous titanyl sulfate solution was added to the dispersion obtained above. The mixture was boiled upon heating for 3 hours while stirring. After allowing to cool, the mixture was filtered and washed with water, followed by drying at a temperature of 900° C. Thus, 78 g of the titanated mica, i.e., the mica coated with titanium dioxide, was obtained.

A 50 g amount of the resultant titanated mica was dispersed in 500 ml of an $8 \times 10^{-3}$M aqueous solution of stannous chloride and, after filtration, was again dispersed in 500 ml of a $5 \times 10^{-4}$M aqueous solution of palladium chloride. After filtration, 50 g of the activated titanated mica obtained was dispersed at a bath temperature of 92°–95° C. and a pH of 7.0–7.5 for one hour in 1400 ml of an electroless gold plating bath comprising 2 g/l potassium, 75 g/l ammonium chloride, 50 g/l sodium oxalate, and 50 g/l sodium phosphite. After filtration and washing with water, the resultant product was dried at a temperature of 120° C. to obtain 53.2 g of a gold pearl gross material having both a brilliant appearance color and interference color.

The amounts of the titanium dioxide and the metallic gold powder coated over the mica in the gold pearl gloss material obtained above were determined in the similar manner as in Example 1.

As a result, it was found that the gold pearl gloss material comprised 52 parts of titanium dioxide and 7.1 parts of gold powder over 100 parts of the mica.

Example 8

(Preparation)

A 50 g amount of titanated mica (i.e., Iriodin 101) having silver pearl gloss, available from Merck, West Germany) was dispersed in 500 ml of an $8 \times 10^{-3}$M aqueous solution of stannous chloride and, after filtration, was again dispersed in 500 ml of a $5 \times 10^{-4}$M aqueous solution of palladium chloride. After filtration, the resultant activated titanated mica (i.e., Iriodin 101) was dispersed at a bath temperature of 20° C. in an electroless silver plating bath comprising 5 g of silver nitrate, 700 ml of water, and 9 ml of 38% formalin. After filtration and washing with water, the resultant product was dried at a temperature of 120° C. to obtain 52.4 g of a silver pearl gloss material having both a brilliant appearance color and interference color.

The amounts of the titanium dioxide and the metallic silver coated over the mica in the silver pearl gloss material obtained above were determined in the similar manner as in Example 1.

As a result, it was found that the silver pearl gloss material comprised 34 parts of titanium dioxide and 4.4 parts of metallic silver over 100 parts of the mica.

Example 9

(Preparation)

A 50 g amount of metallic cobalt coated blue pearl gloss material obtained in Example 1 was coated with silver in the same manner as in Example 8. Thus, 51.0 g of a blue pearl gloss material having both a brilliant appearance color and interference color and having an excellent gloss were obtained.

The amounts of the titanium dioxide and the metallic silver coated over the mica in the silver pearl gloss material obtained above were determined in the similar manner as in Example 1.

As a result, it was found that the silver pearl gloss material comprised 48.2 parts of titanium dioxide and 4.2 parts of silver over 100 parts of the mica.

The color tones of the titanium-mica composite materials obtained in Examples 1 to 9 are shown in Table 1.

TABLE 1

| Example No. | Color tone | HV/C* | |
|---|---|---|---|
| 1 | Blue | 9.02 PB | 5.68/4.61 |
| 2 | Green | 2.30 G | 4.13/3.29 |
| 3 | Blue | 4.23 B | 5.18/3.29 |
| 4 | Reddish purple | 6.13 RP | 4.31/3.16 |
| 5 | Blue | 5.34 PB | 3.41/10.66 |
| 6 | Red | 5.25 RP | 3.36/6.75 |
| 7 | Gold | 4.98 Y | 7.33/10.41 |
| 8 | Silver | 7.50 Y | 8.62/2.13 |
| 9 | Blue | 7.24 PB | 7.38/8.15 |

*The color tone was determined in terms of hue (H), brightness (V), and chroma in a powder-cell method by a color analyzer 607 (manufactured by HITACHI, LTD.).

The pigment characteristic of the titanium-mica composite materials obtained in the above-mentioned Examples 1 to 9 were evaluated.

For comparison, the pigment characteristics of colored titanium-mica pearl gloss pigments (i.e., conventional titanated mica pigment containing coloring agent added thereto commercially available from Mearl Co., U.S.A.) were also evaluated. The comparative commercially available colored titanated mica pigments having color tones similar to or corresponding to the samples of the present invention were selected.

The commercially available pigments used are listed in Table 2.

TABLE 2

| Present Pigment | Comparative Commercially Available Pigment |
|---|---|
| Products of Examples 4 and 6 | Cloisonne Red |
| Products of Examples 1, 3, 5, and 9 | Cloisonne Blue |
| Product of Example 2 | Cloisonne Green |
| Product of Example 7 | Cloisonne Gold |

The compositions of the commercially available pigments are listed in Table 3.

| Composition (%) | TiO$_2$ | Mica | Iron oxide | Ferric ferro-cyanide | Carmine |
|---|---|---|---|---|---|
| Cloisonne Red | 36–42 | 56–62 | — | — | 1.5–3 |
| Cloisonne Blue | 44–49 | 48–54 | — | 2–5 | — |
| Cloisonne Green | 44–48 | 44–48 | 4–7 | 1–3* | — |
| Cloisonne Gold | 32–38 | 58–64 | 2–6 | — | — |

*1 Cromium oxide

The evaluation items were the light stability, heat stability, dispersion stability, and alkali stability. The evaluation methods and the results are as follows.

(1) Light Stability

A sample of the present titanium-mica composite material or the commercially available colored titanated mica was mixed with talc (manufactured by Asada Seifun Co.) in a ratio of 3:7 and 2.5 g of the mixture was molded to the shape of a square having a side length of 20 mm and a thickness of 3 mm, in an inner aluminum dish. The molded sample was irradiated by a xenon lamp for 30 hours. The color tones of the sample before the irradiation and after the irradiation were measured by a color analyzer 607 and the color difference ($\Delta E$) before and after the irradiation was calculated from the measured color values.

(2) Heat Stability

A 3 g amount of a sample of the present titanium-mica composite material or the commercially available colored titanated mica was weighed in a 20 ml porcelain crucible and was heat treated at a temperature of 200° C., 300° C., and 400° C. for 2 hours in air. The color of the powder after the treatment was determined by means of a color analyzer 607 and the color difference ($\Delta E$) before and after the heat treatment was calculated.

(3) Dispersion Stability

A 1.0 g amount of a sample of the present titanium-mica composite material or the commercially available colored titanated mica was charged into a 50 ml graduated test tube provided with a stopper and 50 ml of a 0.2% hexamethaphosphoric acid was then added thereto. The sample was dispersed for 30 seconds in a POLYTRON (manufactured by KINEMATICA) and the dispersion was further dispersed by ultrasonic waves. After dispersion, the test tube was allowed to stand in a test tube stand. The dispersion conditions were visually observed immediately after standing in the test tube stand and again after 5, 10, 30, and 60 minutes.

(4) Alkali Stability

A 1.5 g amount of a sample of the present titanium-mica composite material or the commercially available colored titanated mica was charged into a 50 ml test tube provided with a topper, and 30 ml of a 2N sodium hydroxide solution was then added thereto. The resultant dispersion in the test tube was allowed to stand in a test tube stand. The results were visually observed after 24 hours.

The results are shown in Tables 4 and 5.

TABLE 4

| Example No. or Commercially Available Pigment | Light Stability | Heat Stability 200° C. | 300° C. | 400° C. |
|---|---|---|---|---|
| Example 1 | 0.2 | 0.13 | 0.26 | 3.38 |
| Example 2 | 0.3 | 0.1 | 0.31 | 4.41 |
| Example 3 | 0.3 | 0.1 | 0.22 | 3.35 |
| Example 4 | 0.2 | 0.1 | 0.21 | 4.33 |
| Example 5 | 0.2 | 0.1 | 0.28 | 5.00 |
| Example 6 | 0.2 | 0.11 | 0.19 | 4.62 |
| Example 7 | 0.1 | 0.1 | 0.36 | 4.13 |
| Example 8 | 0.2 | 0.16 | 0.23 | 4.61 |
| Example 9 | 0.2 | 0.1 | 0.35 | 4.77 |
| Cloisonne Red | 35.3 | 3.5 | 26.2 | 45.0 |
| Cloisonne Blue | 5.2 | 3.2 | 36.4 | 37.2 |
| Cloisonne Green | 6.0 | 0.2 | 0.6 | 7.8 |
| Cloisonne Gold | 0.4 | 0.3 | 0.6 | 1.2 |

TABLE 5

| Example No. or Commercially Available Pigment | Dispersion Stability[1] | | | | Alkali Stability[2] |
|---|---|---|---|---|---|
| | 5 min | 10 min | 30 min | 60 min | |
| Example 1 | + | + | + | + | ++ |
| Example 2 | + | + | + | + | ++ |
| Example 3 | + | + | + | + | ++ |
| Example 4 | + | + | + | + | ++ |
| Example 5 | + | + | + | + | ++ |
| Example 6 | + | + | + | + | ++ |
| Example 7 | + | + | + | + | ++ |
| Example 8 | + | + | + | + | ++ |
| Example 9 | + | + | + | + | ++ |
| Cloisonne Red | ± | ± | − | − | − |
| Cloisonne Blue | ± | ± | − | − | − |
| Cloisonne Green | + | + | ± | − | ± |
| Cloisonne Gold | + | + | + | + | ++ |

[1]Evaluation Criteria
+: No sedimentation and good dispersibility
±: Sedimentation progressing with color segregation
−: Complete sedimentation with color segregation
[2]Evaluation Criteria
++: No color tone change and extremely stable
±: Gradually fading and becoming whitish
−: Faded and became white As is clear from the results shown in Tables 4 and 5, the titanium-mica composite materials according to the present invention have an excellent light stability, heat stability, dispersion stability, and alkali stability. That is, with respect to the light stability, the color differences ($\Delta E$) before and after the heat treatment are 0.3 or less (i.e., no substantial change) and the color change is not visually observed in the case of the present samples, whereas the color change before and after the heat treatment is clearly observed, even with the naked eye, in the case of the comparative samples.

With respect to the heat stability, the color difference up to 300° C. is 0.4 or less, which is not substantially observed visually in the case of the present samples. Some discoloration occurs at 400° C., and this discoloration is caused by the oxidation of the metallic powder particles present on the surfaces of the present titanium-mica composite materials to the corresponding metallic oxides. Contrary to this, the color changes are clearly observed, except for Cloisonne Gold, in the case of the commercially available products.

With respect to the dispersion stability, the titanium-mica composite materials according to the present invention are uniformly dispersed even after allowing to stand for one hour, whereas the commercially available products are discolored after allowing to stand for one hour due to the separation of the coloring agents (e.g., ferric ferrocyanide, carmine, chromium oxide) added thereto.

With respect to the alkali stability, the present titanium-mica composite materials are completely stable, whereas the commercially available products are not stable and are gradually discolored.

As is clear from the above-mentioned evaluation results, the present titanium-mica composite materials have the excellent stabilities in the various pigment characteristics.

We claim:

1. A titanium-mica composite material comprising (i) mica, (ii) a first coating composed of titanium dioxide, coated on the surface of the mica, and (iii) a second coating composed of powder particles of at least one metal selected from the group consisting of cobalt, nickel, copper, zinc, tin, gold and silver coated on the first coating, the thickness of the first coating being 200

Å or more and the thickness of the second coating being 5 to 600 Å, the composite exhibiting high chrome and brightness, and consistent appearance color and interference color.

2. A titanium-mica composite material as claimed in claim 1, wherein the amount of the titanium dioxide in the first coating is 10 to 400 parts by weight, based on 100 parts by weight of the mica.

3. A titanium-mica composite material as claimed in claim 1, wherein the thickness of the first coating is 900 Å or more.

4. A titanium composite material as claimed in claim 1, wherein the amount of the metal powder particles is 0.01 to 100 parts by weight, based on 100 parts by weight of the mica.

5. A titanium composite material as claimed in claim 1, wherein the thickness of the second coating is 200 to 600 Å.

6. A coloring composition containing a titanium-mica composite material of claim 1.

7. A cosmetic composition containing, as a coloring agent, a titanium-mica composite material of claim 1.

* * * * *